US012033049B2

(12) United States Patent
Godfrey et al.

(10) Patent No.: US 12,033,049 B2
(45) Date of Patent: Jul. 9, 2024

(54) SEMANTICS PRESERVATION FOR MACHINE LEARNING MODELS DEPLOYED AS DEPENDENT ON OTHER MACHINE LEARNING MODELS

(71) Applicant: Apple Inc., Cupertino, CA (US)

(72) Inventors: Edouard Godfrey, Sunnyvale, CA (US); Gianpaolo Fasoli, Redwood City, CA (US); Kuangyu Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/228,645

(22) Filed: Jul. 31, 2023

(65) Prior Publication Data

US 2023/0385709 A1    Nov. 30, 2023

Related U.S. Application Data

(63) Continuation of application No. 16/805,625, filed on Feb. 28, 2020, now Pat. No. 11,715,043.

(60) Provisional application No. 62/812,888, filed on Mar. 1, 2019.

(51) Int. Cl.
*G06F 18/2415* (2023.01)
*G06N 20/00* (2019.01)
*G06N 20/20* (2019.01)

(52) U.S. Cl.
CPC .............. *G06N 20/20* (2019.01); *G06N 20/00* (2019.01)

(58) Field of Classification Search
CPC .... G06N 20/20; G06N 20/00; G06F 18/2185; G06F 18/2415
See application file for complete search history.

(56) References Cited

U.S. PATENT DOCUMENTS

| 10,402,641 | B1 | 9/2019 | Dang |
| 11,381,715 | B2 | 7/2022 | Barbu |
| 11,494,886 | B2 | 11/2022 | Kumar |
| 2012/0269441 | A1 | 10/2012 | Marchesotti |
| 2015/0242761 | A1 | 8/2015 | Amershi |

(Continued)

FOREIGN PATENT DOCUMENTS

WO    WO 2017/185318    11/2017

*Primary Examiner* — Mia M Thomas
(74) *Attorney, Agent, or Firm* — BAKERHOSTETLER

(57) ABSTRACT

The subject technology receives assessment values determined by a first machine learning model deployed on a client electronic device, the assessment values being indicative of classifications of input data and the assessment values being associated with constraint data that comprises a probability distribution of the assessment values with respect to the classifications of the input data. The subject technology applies the assessment values determined by the first machine learning model to a second machine learning model to determine the classifications of the input data. The subject technology determines whether accuracies of the classifications determined by the second machine learning model conform with the probability distribution for corresponding assessment values determined by the first machine learning model. The subject technology retrains the first machine learning model when the accuracies of the classifications determined by the second machine learning model do not conform with the probability distribution.

20 Claims, 8 Drawing Sheets

(56) References Cited

U.S. PATENT DOCUMENTS

| | | |
|---|---|---|
| 2015/0356461 A1 | 12/2015 | Vinyals et al. |
| 2017/0337464 A1 | 11/2017 | Rabinowitz et al. |
| 2018/0150947 A1 | 5/2018 | Lu |
| 2019/0295223 A1 | 9/2019 | Shen |
| 2019/0325616 A1 | 10/2019 | Chhaya |
| 2020/0125360 A1 | 4/2020 | Iyer |
| 2020/0193299 A1 | 6/2020 | Geva |
| 2020/0265153 A1 | 8/2020 | Li |
| 2021/0287054 A1 | 9/2021 | Zhang |
| 2021/0398676 A1 | 12/2021 | Evans |
| 2022/0067521 A1 | 3/2022 | Chen |
| 2022/0076080 A1* | 3/2022 | Hacmon ............ G06F 11/3692 |
| 2022/0094709 A1 | 3/2022 | Sharma |
| 2023/0120224 A1* | 4/2023 | Yang .................... G06N 20/00 |
| | | 706/12 |
| 2023/0139218 A1* | 5/2023 | Fukushi ................ G16H 50/30 |
| | | 702/19 |
| 2023/0205893 A1* | 6/2023 | Gjorvad ................ G06F 21/577 |
| | | 726/25 |

* cited by examiner

| CONSTRAIN | ASSESSMENTS | | | | | | | | | | |
|---|---|---|---|---|---|---|---|---|---|---|---|
| | 0(BAD) | 1 | 2 | 3 | 4 | 5 | 6 | 7 | 8 | 9 | 10(GOOD) |
| FNR 320 | ~0% | 0.5% | 1% | 10% | 25% | | | | | | |
| FPR 330 | | | | | 25% | | 25% | 10% | 1% | 0.5% | ~0% |

FIG. 3

410 — SCORE $S \in [0, 10]$
FRAUD IF $S \geq X$

420 — $X = 0 \rightarrow$ EVERYONE IS FRAUD
$\rightarrow$ FNR = 0

430 — $X = 10 \rightarrow$ EVERYONE IS NONFRAUD
$\rightarrow$ FPR = 0

440 — $X = 0.1 \rightarrow$ FNR~0

*FIG. 4*

SEMANTICS PRESERVATION FOR MACHINE LEARNING MODELS DEPLOYED AS DEPENDENT ON OTHER MACHINE LEARNING MODELS

CROSS-REFERENCE TO RELATED APPLICATIONS

This application is a continuation of U.S. patent application Ser. No. 16/805,625, entitled "Semantics Preservation For Machine Learning Models Deployed As Dependent On Other Machine Learning Models," filed on Feb. 28, 2020, which claims the benefit of U.S. Provisional Patent Application Ser. No. 62/812,888, entitled "Semantics Preservation For Machine Learning Models Deployed As Dependent On Other Machine Learning Models," filed on Mar. 1, 2019, the disclosure of each of which is hereby incorporated herein in its entirety.

TECHNICAL FIELD

The present description generally relates to developing machine learning applications.

BACKGROUND

Software engineers and scientists have been using computer hardware for machine learning to make improvements across different industry applications including image classification, video analytics, speech recognition and natural language processing, etc.

BRIEF DESCRIPTION OF THE DRAWINGS

Certain features of the subject technology are set forth in the appended claims. However, for purpose of explanation, several embodiments of the subject technology are set forth in the following figures.

FIG. 3 conceptually illustrates an example set of constraints in accordance with one or more implementations.

FIG. 4 conceptually illustrates example statements for configuring a threshold value for determining a binary classification in accordance with one or more implementations.

DETAILED DESCRIPTION

Figure 1:
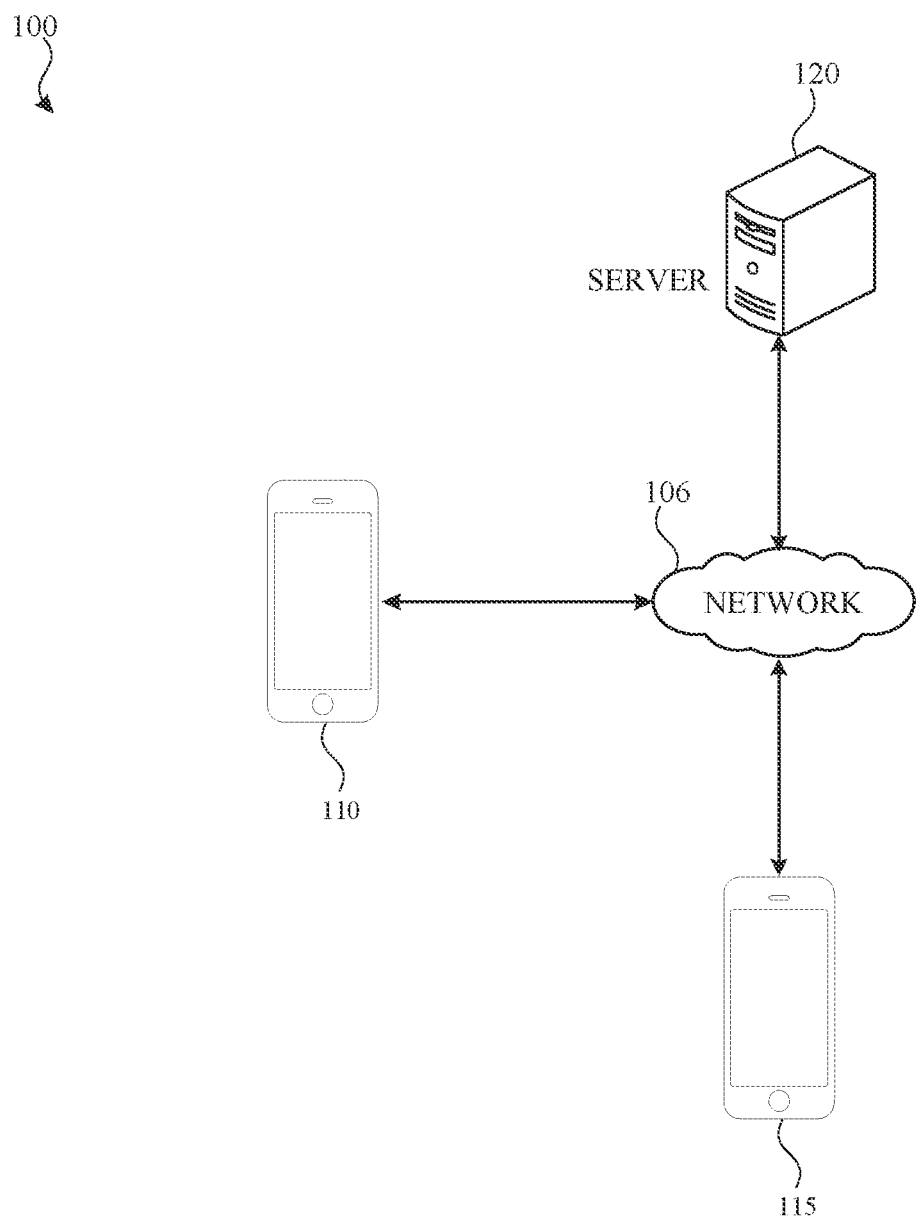
FIG. 1 illustrates an example network environment for in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a significant rise in popularity in recent years due to the availability of massive amounts of training data, and advances in more powerful and efficient computing hardware. Machine learning may utilize models that are executed to provide predictions in particular applications (e.g., analyzing images and videos, fraud detection, spam filtering, image or object classification, etc.) among many other types of applications.

Machine learning models may be deployed in a manner in which a first machine learning model provides an output that is then subsequently passed to a second machine learning model and is used by the second machine learning model as an input for performing a machine learning operation. In an example, this scenario can exist when a behavior of a first electronic device is analyzed by the first machine learning model, which provides a score indicating a probability of a particular classification, which is then provided as input to a second electronic device that determines a course of action to perform based on the inputted score.

A given machine learning model may be utilized to provide a prediction with respect to some set of input data. In an example, for a given machine learning model to provide an accurate prediction, data that the machine learning model has utilized to make the prediction should have a similar distribution as the training data on which was used to train the model. In practice, however, data distributions can change over a period of time. Thus, deploying a model, in practice, typically is not a one-time occurrence and can involve retraining the model with new data and then deploying the retrained model. Consequently, it may be advantageous to determine whether incoming data has a distribution that significantly deviates from the distribution of the training data in order to determine whether retraining the model would be beneficial.

Training a model involves extensive computing resources (e.g., processor, memory, power, etc.) which may be more suitable on a particular electronic device (e.g., a server) than other devices (e.g., mobile electronic devices). Thus, retraining the model, in some instances, is performed during particular times (e.g., off-peak hours, nighttime, etc.) that may be less burdensome on the electronic device as more computing resources are available.

For a machine learning model that is deployed as dependent on another machine learning model (e.g., where one model provides an output for a second downstream model), it can be necessary for the other model, e.g. the second downstream model, to be retrained if one of the models has been retrained using new input data. Otherwise, the second downstream model may not provide consistent outputs. As a result, in an example with a first model being provided on a first electronic device, and a downstream model being provided on a second electronic device, this creates a scenario where each of the two electronic devices is tasked with retraining its respective model. In computing environments where such electronic devices do not have comparable or similar computing capability, such retraining can adversely impact the interoperability between the respective machine learning models by impacting the accuracy of the machine learning models until retraining and redeployment of the retrained models are completed.

The subject technology provides a data specification (e.g., a set of constraints as referred to herein) that enables a set of two or more machine learning models (e.g., an upstream machine learning model and a downstream machine learning model) to preserve the semantics of values while allowing distribution of the values to change over time. This further allows the downstream machine learning model to be retrained without requiring that the upstream machine learning model be retrained in order to provide consistent outputs. Thus, the subject technology enables the set of machine learning models to undergo retraining in an asymmetrical manner.

Implementations of the subject technology improve the computing functionality of a given electronic device by allowing machine learning models that are deployed in a dependent manner to be independently updated thereby avoiding retraining both models when a respective model is updated. Furthermore, in one or more implementations where a server machine learning model is deployed as being dependent on multiple client machine learning models, the server machine learning model can support multiple different versions/updates to the client machine learning models, thereby allowing the different client machine learning models to be modified/updated asynchronously.

FIG. 1 illustrates an example network environment 100 for in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110, the electronic device 115 and/or the server 120. In one or more implementations, the network 106 may be an interconnected network of devices that may include, or may be communicatively coupled to, the Internet. For explanatory purposes, the network environment 100 is illustrated in FIG. 1 as including the electronic device 110, the electronic device 115, and the server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a mobile electronic device (e.g., smartphone). The electronic device 110 may be, and/or may include all or part of, the electronic system discussed below with respect to FIG. 8.

In one or more implementations, the electronic device 110 may provide a system for receiving a machine learning model deployed, from the server 120, to the electronic device 110 (e.g., a client). As discussed further below, a machine learning model may be trained by the server 120, and then deployed to a client such as the electronic device 110. Further, the electronic device 110 may provide one or more machine learning frameworks for developing applications using such machine learning models. In an example, such machine learning frameworks can provide various machine learning algorithms and models for different problem domains in machine learning. In an example, the electronic device 110 may include a deployed machine learning model that provides an output of data to a downstream machine learning model (e.g., deployed on the server 120 as discussed further below).

As further shown, the electronic device 115 may provide a system for receiving a machine learning model, which may include a client deployed model from the server 120. Similar to the electronic device 110, the electronic device 115 may provide one or more machine learning frameworks for developing applications using machine learning models. In one or more implementations, when the client models are updated at the server 120, the updated models may be deployed asynchronously to the electronic devices 110, 115 such that the electronic device 110 may be utilizing a previous version of the model while the electronic device 115 is utilizing an updated version of the model.

The server 120 may provide a system for training a machine learning model using training data, where the trained machine learning model is subsequently deployed to the server 120. Such a machine learning model on the server 120 may be dependent on a given machine learning model deployed on the electronic device 110. The machine learning model deployed on the server 120 may be referred to as a downstream model and the server 120 may be referred to as a downstream device herein. The electronic device 110, for example, may communicate with the server 120 to provide an output from its deployed machine learning model, which is then provided as input to the machine learning model deployed on the server 120. The machine learning model deployed on the server 120 can then perform one or more machine learning algorithms using the input provided from the electronic device 110. Similarly, the electronic device 115 can also communicate with the server 120 to provide an output from its deployed machine learning model. The server 120, in an implementation, trains both of the models that are deployed on the electronic device 110 and the electronic device 115.

Figure 2:
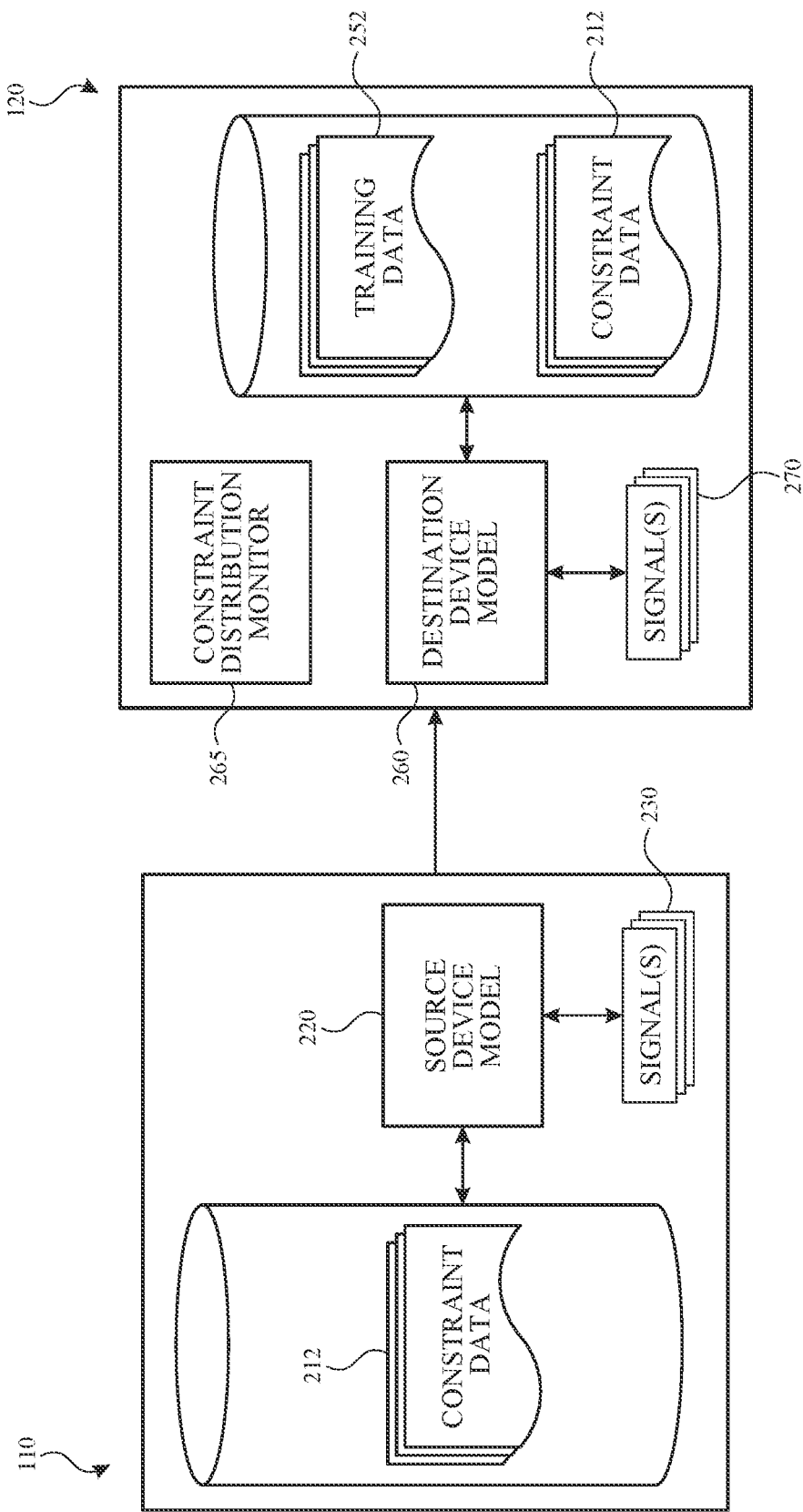
FIG. 2 illustrates an example computing architecture for a system providing semantics preservation of machine learning models.

FIG. 2 illustrates an example computing architecture for a system providing semantics preservation of machine learning models, in accordance with one or more implementations. For explanatory purposes, the computing architecture is described as being provided by the electronic device 110, and the server 120 of FIG. 1, such as by a processor and/or memory of the electronic device 110 and/or the server 120; however, the computing architecture may be implemented by any other electronic devices. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the electronic device 110 includes constraint data 212 corresponding to a data specification for providing semantics (e.g., providing meaning to output values that may be interpreted by a downstream model) to respective values from a distribution of values. In an example, such semantics are defined based on a set of constraints that, for a binary classification problem, indicate respective probabilities for an output of the model to be in one class or another class. In particular, an example set of constraints can include respective indicators of confidence to corresponding score values for assigning a classification to a particular score value. In the context of machine learning, such semantics enable a machine learning model to interpret and associate meaning to the values which can facilitate a more accurate analysis of the data in order to provide, in an example, a prediction or classification. An example of constraint data is discussed in more detail in FIG. 3 below. As further shown, the server 120 includes constraint data 212 for storing information corresponding to one or more sets of constraints.

In an example, the electronic device 110 may utilize one or more machine learning algorithms that uses training data 210 for training a machine learning model such as a source device model 220. The electronic device 110 may be referred to as an upstream device or a client device herein, and the source device model 220 may be referred to as an upstream model or a client model herein. Similarly, in an example, the server 120 may utilize one or more machine learning algorithms that uses training data 252 for training a machine learning model such as a destination device model 260. The server 120 may be referred to as a downstream device or a destination electronic device herein, and the destination device model 260 may be referred to as a downstream model or server model herein.

After being deployed on the electronic device 110, the source device model 220 may receive one or more on-device signals 230 as inputs to provide a prediction based at least in part on a set of observed data provided by the signals 230. In an example, the signals 230 may include data from sensors provided by the electronic device 110 where the signals 230 correspond to user activity on the electronic device 110 or some other signal such as geographic location, network location, time of day, device type, transaction amount, etc. The signals 230 may also be based on other activity on the electronic device 110, including non-user activity (e.g., computing resource utilization by background or system processes, etc.). Examples of user activity can include user inputs performed on the electronic device, or some other action performed by a user (e.g., changing contact information, user login, user viewing certain information, etc.). It is further appreciated that the electronic device 110 does not provide such signals 230 to a downstream device such as the server 120, which facilitates privacy and security of the signals and/or activity performed on the source device.

The source device model 220 can provide an output of data corresponding to an assessment (e.g., prediction) that is then sent to a downstream model (e.g., the destination device model 260) that uses the assessment as input. After receiving the assessment, the destination device model 260 can interpret the assessment based on information provided by the constraint data 212, which in an example provides one or more constraints in order to interpret (e.g., associate meaning to) a value provided by the assessment such as an assessment score value. This interpretation by the destination device model 260 can subsequently be utilized to make a decision on an action to perform. In an example, such a score value corresponds to a metric indicating a confidence of an assessment (e.g., a prediction or some other conclusion), based on a set of signals from the source electronic device, belonging to a particular classification (e.g., fraud or non-fraud, etc.). As discussed further herein, such a score value may be utilized in conjunction with a threshold value and/or a set of constraints to determine a particular classification in a binary classification model. Moreover, the destination device model 260 can utilize server-side signals 270 (or utilize a rule-based mechanism) in conjunction with the assessment received from the source device model 220 in order to make a decision or initiate an action to be performed by the server 120. In an example, the server-side signals 270 may be based on data from a database and/or data received from a third party server. In an example, feedback data may be stored in the database where the feedback data is data subsequently received after particular transactions have taken place and indicates or confirms that the particular transactions were fraudulent or in some other classification. Such feedback data may be provided by a third party in an example (e.g., a vendor or business entity).

As further shown in FIG. 2, the server 120 includes a constraint distribution monitor 265 that enables the server 120 to monitor the end results (e.g., fraud or non-fraud) with respect to the assessment scores to ensure that the constraints are being met by the client deployed models (e.g., the source device model 220). In an example, the constraint distribution monitor 265 determines a first distribution of the assessment scores during a first period of time. As more results are subsequently received by the server 120, the constraint distribution monitor 265 can determine that the first distribution has deviated beyond a threshold amount during a second period of time, and notify the server 120 to initiate retraining of the client deployed model.

Further, although the electronic device 115 is not shown in FIG. 2, it is appreciated that the electronic device 115 may include similar components (e.g., constraint data, a client deployed model, on-device signals, etc.) and interact with the server 120 in a similar way as discussed above in connection with the electronic device 110.

FIG. 3 conceptually illustrates an example set of constraints in accordance with one or more implementations. FIG. 3 will be discussed by reference to FIG. 2, particularly with respect to respective components of the electronic device 110 and/or the server 120. Moreover, although the example set of constraints is provided in tabular format, it is appreciated that other formats may be utilized and still be within the scope of the subject technology.

In the example of FIG. 3, a set of constraints 310 is provided in a tabular format with various values for a false negative rate (FNR) and a false positive rate (FPR) for output data provided by a particular machine learning model. The set of constraints 310 enables independent evolution of upstream and downstream models on separate devices. In particular, the set of constraints 310 describes various probabilities for FNR and FPR to evaluate assessment scores that are received as inputs, from the source device model 220, by the destination device model 260. The assessment scores may be provided by an upstream model (e.g., the source device model 220) deployed on a source device such as the electronic device 110, and then utilized by a downstream model on a different device (e.g., the destination device model 260 on the server 120) to make a decision on an action to perform. The following discussion will mention fraud detection as an example problem that the upstream model is addressing by, for example, providing an assessment score that classifies whether a transaction (e.g., a credit card payment or some other type of financial payment) is fraudulent or is legitimate (e.g., non-fraudulent) based at least in part on one or more on-device signals that are received by the model.

The set of constraints 310 enables the upstream model to provide, as output values, a classification corresponding to an assessment score that conforms with pre-established constraints that are defined by the set of constraints 310. In this manner, the downstream model (e.g., the destination device model 260) is enabled to interpret the meaning of the assessment score based on the constraints provided by the set of constraints 310. Further, the upstream model may be modified so long as the upstream model provides output data that conforms to the constraints for the classification that are defined in the set of constraints 310.

As shown, the set of constraints 310 includes respective columns associated with an assessment score ranging in value from 0 to 10 where a value of 0 indicates a "bad" assessment score, e.g. fraudulent, and a value of 10 indicates a "good" assessment score, e.g., legitimate, and values 2 to 9 corresponding to varying degrees of the assessment score. It is appreciated that, in an implementation, the "bad" and "good" assessment scores can be switched such that the value of 10 indicates a "bad" assessment score and the value of 0 indicates a "good" assessment score. The set of constraints 310 further includes a row 320 corresponding to an FNR for various assessment score values, and a row 330 corresponding to an FPR for various assessment score values.

In an example where a model is deployed on a client (e.g., on the electronic device 110 or the electronic device 115) for detecting a fraudulent transaction (e.g., based on one or more on-device signals), the model may provide an assessment score that indicates whether the transaction belongs in a first classification of fraudulent or a second classification of legitimate (e.g., non-fraudulent). In the set of constraints 310, for a corresponding assessment score, an FNR value indicates a proportion (e.g., percentage) of fraudulent transactions that are not identified and allowed, and an FPR value indicates a proportion of legitimate transactions that are blocked. Thus, in the set of constraints 310, each FNR or FPR value in a particular column serves as an indication of confidence or probability of a false negative and/or a false positive to a corresponding assessment score of the column. For example, an FPR value of 0% for an assessment score value of 0 has the greatest confidence or probability of not being a false positive, while an FNR value of 0% for an assessment score value of 10 also has the greatest confidence or probability of not being a false negative.

Further, in the example of the set of constraints 310, values of the assessment score that fall toward the middle of the range are associated with less confidence of not being a false positive and/or a false negative. For example, when the value of the assessment score is 2, the set of constraints 310 indicates an associated 1% FPR value, and the rate of misclassification (e.g., an erroneous classification) gradually increases towards the middle of the range of values of the assessment scores in the set of constraints 310 with a greatest percentage of an FPR (e.g., 25%) being associated with an assessment score value of 4. Similarly, the set of constraints 310 indicates an associated 1% FNR value for an assessment score value of 8, and the rate of misclassification gradually increases towards the middle of the range of values in the set of constraints 310 with a greatest percentage of FNR (e.g., 25%) being associated with an assessment score value of 6.

When an upstream machine learning model outputs assessment scores that conform with the set of constraints 310, a downstream machine learning model (e.g., the destination device model 260 on the server 120) can use a given assessment score in a rule-based decision mechanism in conjunction with other features in a downstream machine learning model (e.g., the destination device model 260). Such rules can be based on heuristics and/or hand-tuned by the developer of the model for the type of application or problem that the model addresses. In another example, the assessment score can be utilized as a feature in the downstream model in conjunction with other downstream device signals to perform a particular action. In the context of fraud detection, the action performed by the downstream device may include denying access to a resource by the upstream device. In yet another example, the downstream device (e.g., the server 120) can solely utilize a rule that enables the downstream device to perform an action based on the value of the assessment score and could forgo performing a prediction, by the downstream model, based on the assessment score thereby conserving computing resources of the downstream device that would be consumed by computing the prediction.

Although the above example involves classifying whether a transaction is fraudulent, a given set of constraints may be utilized for other types of classification, including models for image recognition between two different entities or objects (e.g., a cat and a dog, man or woman, etc.), whether an email is spam or not spam, among other types of applications.

As discussed before, an upstream model deployed on a client (such as the electronic device 110 or the electronic device 115) can provide an assessment score for providing an indication of a fraudulent transaction or non-fraudulent transaction. The following discussion relates to example statements that can be utilized as part of algorithms for a client deployed model where, during training, a threshold can be utilized to ensure that the model enforces a set of constraints.

FIG. 4 conceptually illustrates example statements for configuring a threshold value for determining a binary classification in accordance with one or more implementations. Such statements may be implemented in appropriate code form for algorithms in a machine learning model and/or utilized in training or retraining the machine learning model (e.g., a client deployed model).

The example of FIG. 4 illustrates various statements for 1) defining a range for assessment score values, 2) when an instance of fraud occurs, and 3) various threshold values and their associated meaning in the context of a prediction provided by a machine learning model (e.g., for fraud detection or another type of binary classification).

As illustrated in FIG. 4, a statement 410 shows a score (e.g., "s") with a range of values from 0 to 10 (e.g., similar to the range of values for assessment scores from 0 to 10 as discussed in FIG. 3). A machine learning model (e.g., the upstream model such as the source device model 220) computes the score within the range that indicates a likelihood of being classified as fraud, such as the assessment scores from 0 to 10 in FIG. 3.

As further shown in the statement 410, a threshold value (e.g., "X") can be selected, which is included in a relationship where if a score is greater than or equal to the value of the threshold value, then the machine learning model (e.g., the upstream model) will predict that the score belongs in a class corresponding to fraudulent activity (e.g., "FRAUD"). In other words, the threshold value can correspond to a boundary value of an output variable (e.g., the score) that is utilized to assign the output variable in one class or another class (e.g., fraud or non-fraud). In the context of training or retraining the model, based on the threshold, a determination can be made to confirm that the model is providing output variables based on training data that are consistent with a set of constraints (e.g., the set of constraints 310 with expected FNR and FPR for respective values of assessment scores).

In an example where the threshold value is closer or equal to zero (0), such as shown in a statement 420, the machine learning model will deny more users as scores above the threshold value will classified as being fraud. In an example where the threshold value is closer or equal to ten (10), such as in a statement 430, the machine learning model will allow more users as scores below the threshold will be classified as being non-fraud. Thus, it is appreciated that a small value of the threshold value, such as in a statement 440, enables the machine learning model to potentially identify more fraudulent activity as the FNR will be close to zero. In this manner, during training or retraining of the model, the threshold value (corresponding to "X" value in FIG. 4) can be changed and the server 120 can observe how such a change would impact a number of false positives or false negatives in order confirm that the model will enforce a given set of constraints (e.g., the set of constraints 310). Thus, a particular threshold value can be selected that is appropriate for the enforcing the FNR and FPR provided in the set of constraints 310.

The threshold value discussed above for a binary classification model represents an example of a threshold for interpretation of a prediction. However, it is appreciated that other types of interpretation thresholds may be used in various types of machine learning problems. For example, in an N-way classification (e.g., multiclass), multiple boundary values can be utilized by a model to determine which particular class from the N classes for assigning a particular input variable.

Data distributions for the outputs of a given machine learning model can change over time. In an example, the changing data distribution may be a result of an upstream model changing parameters of the model in connection with its machine learning algorithms such as modifying and/or including features (e.g., based on the signals 230) that are utilized to provide a prediction or assessment. When it is determined that incoming new data has output values that have a distribution that deviates beyond a threshold amount from the distribution of the outputs based on the training data, retraining the model with new data and then deploying the retrained model may be performed to help improve the accuracy of predictions provided by the model and to enforce the constraints defined in a given set of constraints, such as the set of constraints 310.

In an implementation, the constraint distribution monitor 265 of the server 120 can monitor whether any percentage of false positives or negatives for any of the scores from the source device model 220 deviates from the constraints beyond a threshold amount, and then initiate retraining of the source device model 220. The server 120 retrains the source device model 220 using a set of new and/or updated training data, the constraints corresponding to the FNR and FPR provided by the set of constraints 310, and an appropriate threshold value (e.g., variable "X" as discussed above) that results in classifications of scores that conform with the FNR and FPR defined in the set of constraints 310. The server 120 then deploys the retrained upstream machine learning model.

Figure 5:
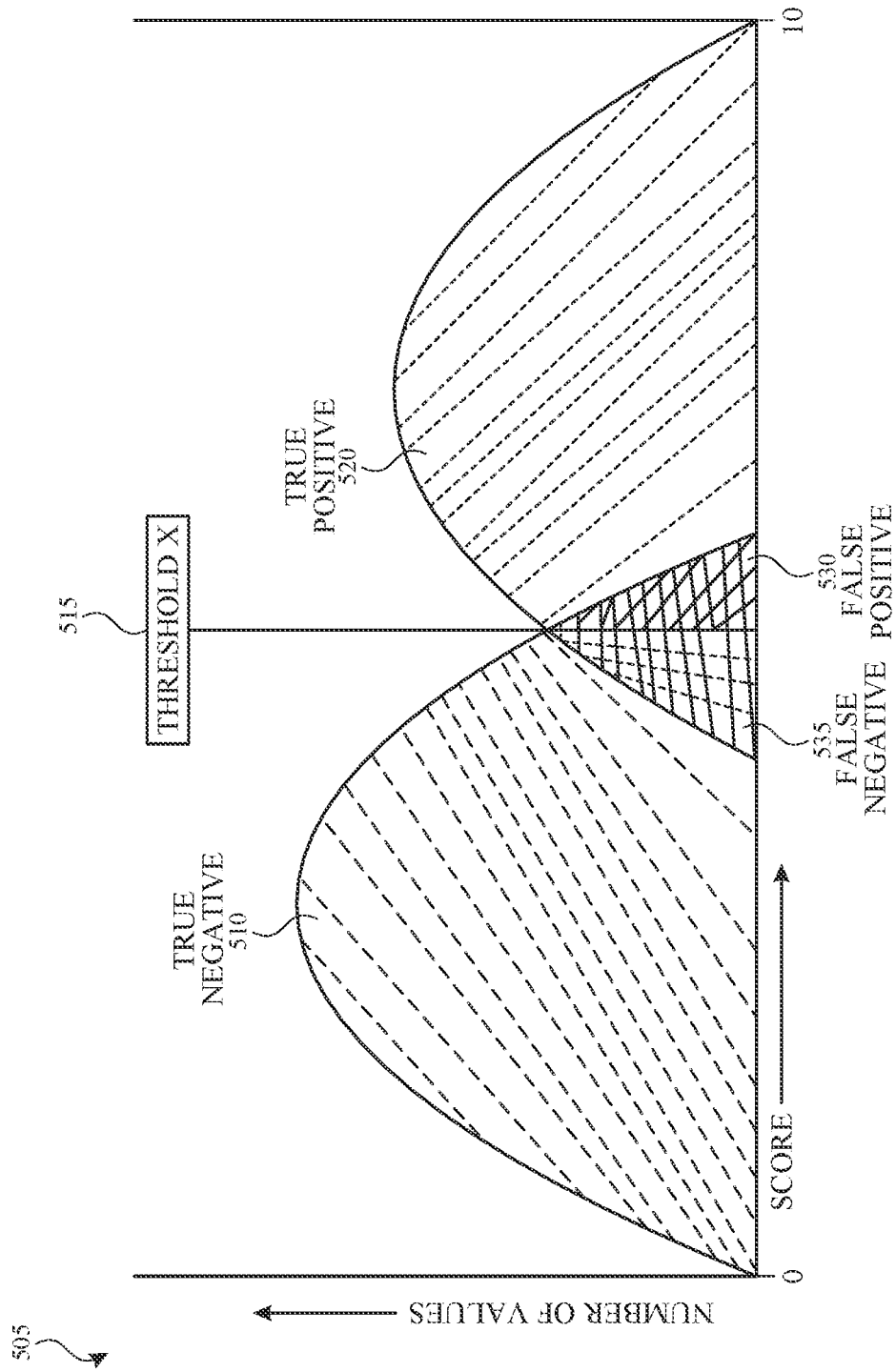
FIG. 5 conceptually illustrates a distribution of data in connection with a binary classification model in accordance with one or more implementations.

FIG. 5 conceptually illustrates a distribution of data in connection with a binary classification model in accordance with one or more implementations. The depiction in FIG. 5 shows an example distribution of assessment scores from 0 to 10 based on the outputs of a client deployed model (e.g., the source device model 220).

As illustrated in FIG. 5, graph 505 represents the distribution of an output variable for a machine learning model (e.g., corresponding to a score such as the "X" score discussed above) where the X axis represents values of the score while the Y-axis indicates the number of values for a respective score from a given data set. In an example, a downstream device can monitor the distribution of values (such as the constraint distribution monitor 265 of the server 120) to determine the performance of an upstream model (e.g., the source device model 220) and whether the model should be retrained with new and/or updated training data if the distribution has deviated from the constraints defined in a given set of constraints, such as the set of constraints 310. In another example, a downstream device, such as the server 120, can monitor the distribution of values to determine the performance of an upstream model (e.g., the source device model 220) and whether the model should be retrained with new inputs in order to enforce constraints defined in a set of constraints.

In the example of FIG. 5, each of the score values is placed in one of the two classes "negative" and "positive" (e.g., non-fraud and fraud) based on the score values and a class boundary corresponding to a threshold value (e.g., the threshold value correspond to "x" as discussed above). For example, if the score values are various real numbers within the range 0 and 10, and the threshold value is set to 5, an input assessment score with a value of 2 would be placed in the "negative" class (non-fraud), while an input assessment score with a value of 8 would be placed in the "positive" class (fraud).

In the graph 505, an area 510 represents scores of true negatives (e.g., non-fraud class), while an area 520 represents scores of true positives (e.g., fraud class). As further shown, an area of intersection between the curves corresponding to area 510 and area 520 represents likely misclassifications corresponding to false positives and false negatives. An area 530 to the right of the threshold value 515 represents false positives, while false negatives are represented by an area 535 to the left of threshold value 515.

Figure 6:
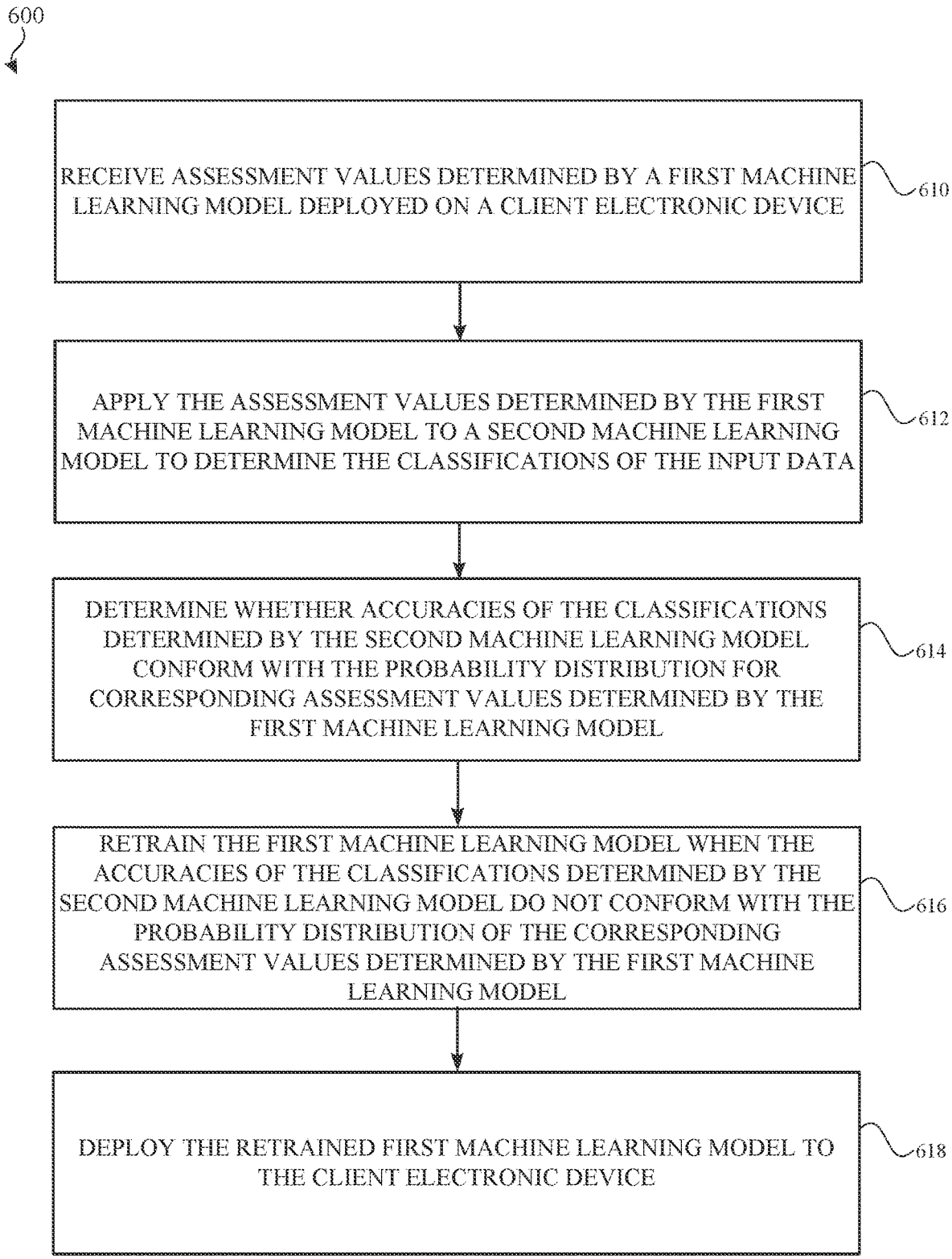
FIG. 6 illustrates a flow diagram of an example process for determining whether score values provided by client models conform with a set of constraints in accordance with one or more implementations.

FIG. 6 illustrates a flow diagram of an example process 600 for determining whether score values provided by client models conform with a set of constraints in accordance with one or more implementations. For explanatory purposes, the process 600 is primarily described herein with reference to components of the computing architecture of FIG. 2, which may be executed by one or more processors of the server 120 of FIG. 1. However, the process 600 is not limited to the server 120, and one or more blocks (or operations) of the process 600 may be performed by one or more other components of other suitable devices, such as by the electronic device 110, the electronic device 115, or another server. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The server 120 receives assessment values determined by a first machine learning model deployed on a client electronic device, the assessment values being indicative of classifications of input data and the assessment values being associated with constraint data that comprises a probability distribution of the assessment values with respect to the classifications of the input data (610). The server 120 applies the assessment values determined by the first machine learning model to a second machine learning model to determine the classifications of the input data (612). The server 120 determines whether accuracies of the classifications determined by the second machine learning model conform with the probability distribution for corresponding assessment values determined by the first machine learning model (614). The server 120 retrains the first machine learning model when the accuracies of the classifications determined by the second machine learning model do not conform with the probability distribution of the corresponding assessment values determined by the first machine learning model (616). The server 120 deploys the retrained first machine learning model to the client electronic device (618).

Figure 7:
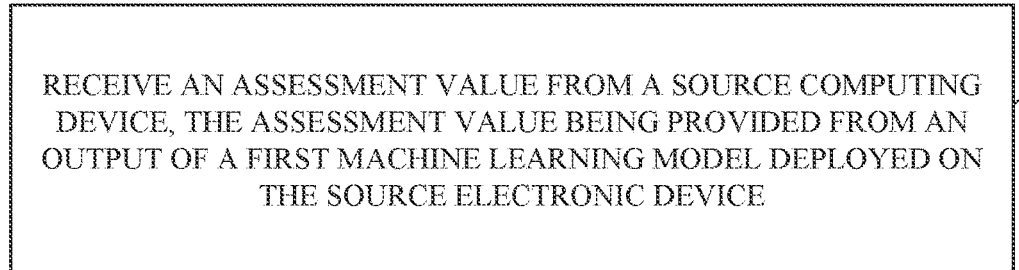
FIG. 7 illustrates a flow diagram of an example process for determining a classification based on a set of constraints and a score received from a client model in accordance with one or more implementations.
Figure 7:
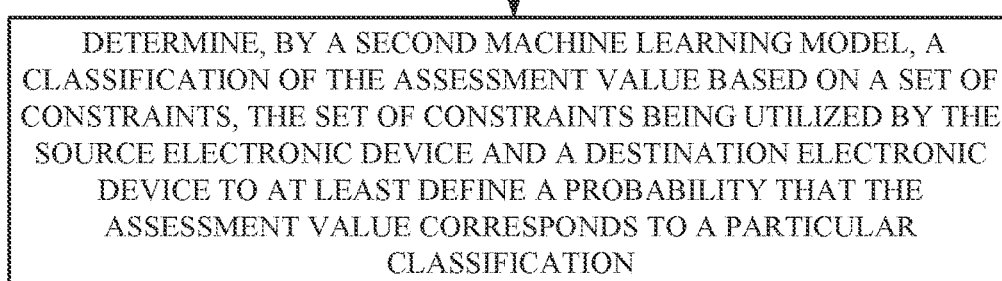
Figure 7:
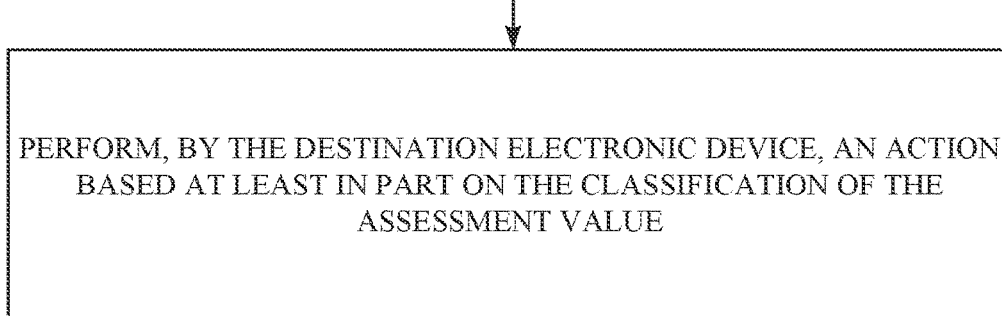

FIG. 7 illustrates a flow diagram of an example process 700 for determining a classification based on a set of constraints and a score received from a client model in accordance with one or more implementations. For explanatory purposes, the process 700 is primarily described herein with reference to components of the computing architecture of FIG. 2, which may be executed by one or more processors of the server 120 of FIG. 1. However, the process 700 is not limited to the server 120, and one or more blocks (or operations) of the process 600 may be performed by one or more other components of other suitable devices, such as by the electronic device 110 and/or the electronic device 115, or another server. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The server 120 receives an assessment value from a source electronic device (e.g., the electronic device 110 or the electronic device 115) where the assessment value is provided from an output of a first machine learning model deployed on the source electronic device (710). The server 120 determines, using a second machine learning model deployed on the server 120, a classification of the assessment value based on a set of constraints, where the set of constraints is utilized by the source electronic device and the destination electronic device to at least define a probability that the assessment value corresponds to a particular classification (712). Further, the server 120 performs an action based at least in part on the classification of the assessment value (714). In an example, such an action may include denying the source electronic device access to a requested resource and/or to deny a transaction from being completed.

Figure 8:
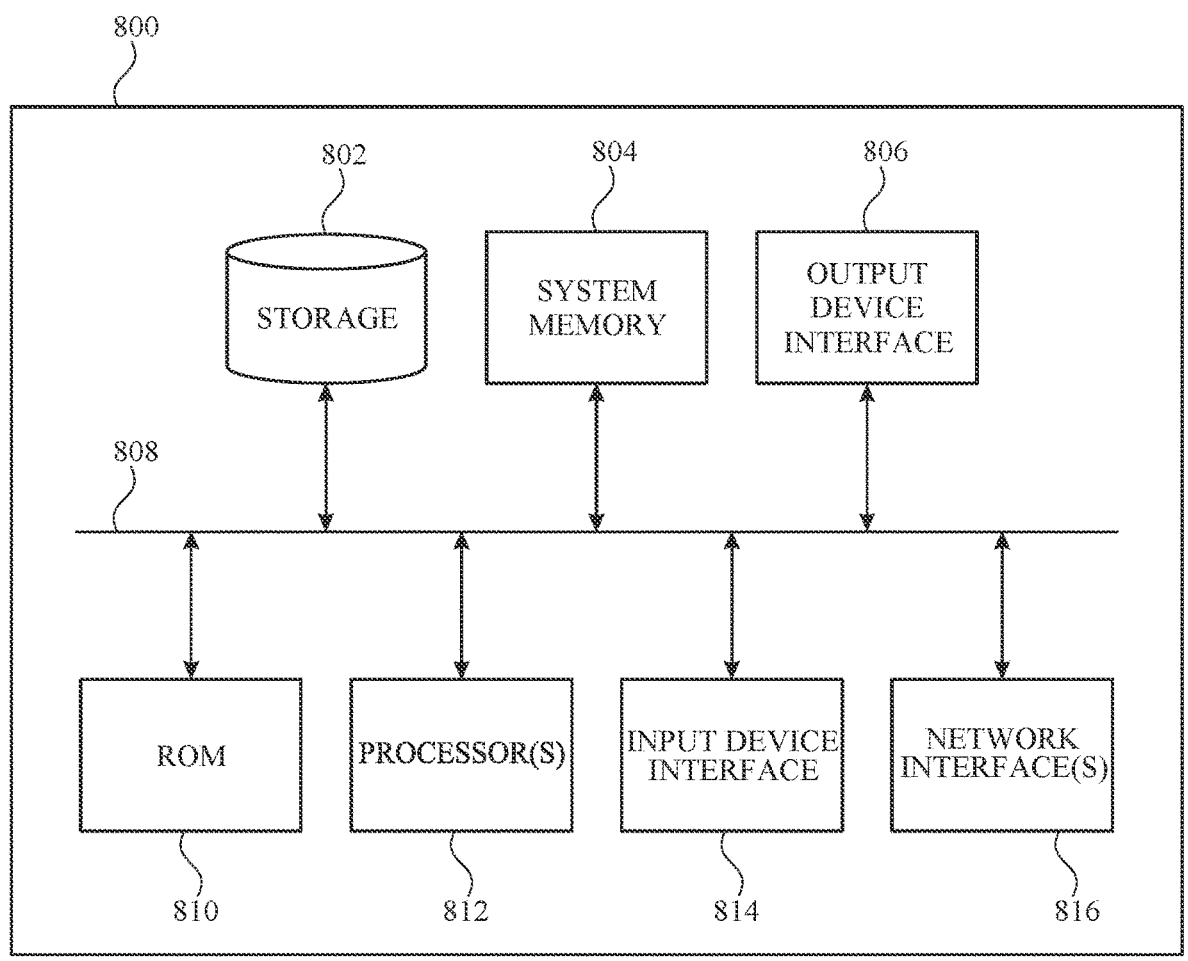
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 110, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A non-transitory computer-readable medium comprising instructions, which when executed by a computing device, cause the computing device to perform operations comprising:
    receiving, at a destination electronic device, an assessment value from a source electronic device, the assessment value corresponding to a transaction being conducted by the source electronic device;
    determining, by a machine learning model deployed on the destination electronic device, a classification based on the assessment value based on a set of constraints, the set of constraints being utilized to at least define a probability that the assessment value corresponds to a particular classification, and the classification indicating a likelihood that the transaction being conducted by the source electronic device is fraudulent; and
    preventing or allowing, by the destination electronic device, the transaction being conducted by the source electronic device based at least in part on the classification of the assessment value.

2. The non-transitory computer-readable medium of claim 1, wherein the assessment value is provided from an output of another machine learning model deployed on the source electronic device.

3. The non-transitory computer-readable medium of claim 1, wherein the set of constraints are utilized by the source electronic device and the destination electronic device to at least define a probability that the assessment value corresponds to a particular classification.

4. The non-transitory computer-readable medium of claim 1, wherein the classification comprises a binary classification.

5. The non-transitory computer-readable medium of claim 1, wherein a probability distribution of the set of constraints comprises a first set of percentages for false positives and a second set of percentages for false negatives corresponding to the assessment value.

6. The non-transitory computer-readable medium of claim 1, wherein the assessment value is based at least in part on signals indicating activity performed on the source electronic device, and the signals from the source electronic device are not shared with the destination electronic device that receives the assessment value.

7. The non-transitory computer-readable medium of claim 6, wherein the activity performed on the source electronic device comprises application usage on the source electronic device.

8. A method comprising:
    receiving, at a destination electronic device, an assessment value from a source electronic device, the assessment value corresponding to a transaction being conducted by the source electronic device;
    determining, by a machine learning model deployed on the destination electronic device, a classification based on the assessment value based on a set of constraints, the set of constraints being utilized to at least define a probability that the assessment value corresponds to a particular classification, and the classification indicating a likelihood that the transaction being conducted by the source electronic device is fraudulent; and
    preventing or allowing, by the destination electronic device, the transaction being conducted by the source electronic device based at least in part on the classification of the assessment value.

9. The method of claim 8, wherein the assessment value is provided from an output of another machine learning model deployed on the source electronic device.

10. The method of claim 8, wherein the set of constraints are utilized by the source electronic device and the destination electronic device to at least define a probability that the assessment value corresponds to a particular classification.

11. The method of claim 8, wherein the classification comprises a binary classification.

12. The method of claim 8, wherein a probability distribution of the set of constraints comprises a first set of percentages for false positives and a second set of percentages for false negatives corresponding to the assessment value.

13. The method of claim 8, wherein the assessment value is based at least in part on signals indicating activity performed on the source electronic device, and the signals from the source electronic device are not shared with the destination electronic device that receives the assessment value.

14. The method of claim 13, wherein the activity performed on the source electronic device comprises application usage on the source electronic device.

15. A device comprising:
    a memory; and
    at least one processor configured to:
        receive an assessment value from a source electronic device, the assessment value corresponding to a transaction being conducted by the source electronic device;
        determining, by a machine learning model deployed on the device, a classification based on the assessment value based on a set of constraints, the set of constraints being utilized to at least define a probability that the assessment value corresponds to a particular classification, and the classification indicating a likelihood that the transaction being conducted by the source electronic device is fraudulent; and preventing or allowing the transaction being conducted by the source electronic device based at least in part on the classification of the assessment value.

16. The device of claim 15, wherein the assessment value is provided from an output of another machine learning model deployed on the source electronic device.

17. The device of claim 15, wherein the set of constraints are utilized by the source electronic device and the device to at least define a probability that the assessment value corresponds to a particular classification.

18. The device of claim 15, wherein the classification comprises a binary classification.

19. The device of claim 15, wherein a probability distribution of the set of constraints comprises a first set of percentages for false positives and a second set of percentages for false negatives corresponding to the assessment value.

20. The device of claim 15, wherein the assessment value is based at least in part on signals indicating activity performed on the source electronic device, and the signals from the source electronic device are not shared with the device.

* * * * *